Jan. 10, 1956   W. O. LYTLE   2,730,598
TRANSPARENT ELECTRO-CONDUCTING ARTICLE
Filed Aug. 17, 1951

INVENTOR.
WILLIAM O. LYTLE
BY
Oscar L. Spencer
ATTORNEY.

United States Patent Office 2,730,598
Patented Jan. 10, 1956

2,730,598

TRANSPARENT ELECTRO-CONDUCTING ARTICLE

William O. Lytle, New Kensington, Pa., assignor to Pittsburgh Plate Glass Company, Allegheny County, Pa., a corporation of Pennsylvania Application August 17, 1951, Serial No. 242,352

11 Claims. (Cl. 201—73)

This invention relates to a method of producing transparent electroconductive articles, and it has particular relation to novel transparent electroconductive articles and to an improved method for depositing electroconductive transparent coatings upon ceramic or refractory viewing closures.

It is known that transparent electroconductive films may be deposited upon glass by applying stannic chloride to the surface of glass heated above 500° F., preferably 850 to 1350° F. Films of superior conductivity may be produced according to methods described in a co-pending application for U. S. Letters Patent, Serial No. 762,658, filed July 22, 1947, by William O. Lytle, now Patent No. 2,614,944, by spraying plate, window or other glass while it is heated to a temperature of above 500° F., but below the temperature at which the glass becomes molten, with tin tetrachloride or other tin or metal salts in aqueous solution or in vapor state in the presence of a reducing agent, such as methanol, phenyl hydrazine hydrochloride or other agents. The films thus obtained are of unknown composition but appear to contain a preponderant amount, on the order of 97 to 99 percent, of a tin oxide, and certain impurities which may include metallic tin, carbon, silicon, sodium and chlorine and other impurities, depending upon the composition of the applied tin-containing solution.

These films have a thickness of about 50 to 800 millimicrons, are transparent, and have the unusual characteristic of being electroconductive, the particular degree of electroconductivity being dependent to a large degree upon the nature of the process of depositing the films. Tin oxide films which are deposited in accordance with the process described above have a resistance below about 500 ohms per unit square, and a specific resistivity below about 0.002 ohm centimeters. Further details respecting the production of these films will be supplied hereinafter.

Although articles having such films are useful in many fields, they have been found to be especially useful as windshields or viewing closures in automobiles, aircraft, trains, and similar automotive vehicles. In such use the coating is placed in series with a source of electric potential, and is used as a heating element in order to heat the closure and prevent deposition of ice, fog, etc., thereupon. Usually, they are laminated with a suitable plastic, such as polyvinyl butyral, to reinforce the glass and provide a so-called "safety glass" construction.

In the past, an unduly high number of windshields or like panels of the type herein described have failed in use or test. This failure frequently is manifested by fracture of the glass after an electric potential has been imposed across the bus bars to cause the film to be heated to a suitable temperature (for example, 100 to 125° F. or above) for a period of time. Such failure has been discovered to be particularly apt to occur in certain panels having a contour such that the bus bars must be disposed in a non-parallel relationship.

It has been found that one of the causes of such failure is unequal distribution of current flow along one or both of the bus bars. When a panel is provided with non-parallel bus bars, the current flow through uniform resistivity films will tend to be highest at the point or points where the bus bars are closest together, and lowest at the point or points where the bus bars are farthest apart. In like manner, when one bus bar of a pair of bus bars (whether parallel or not) is longer than the other, the density of current flow and consequent heat generation tends to be highest at the ends of the shorter bus bar.

A further possibility occurs in the case of a non-rectangular panel having the shape of a parallelogram in which the bus bars are substantially parallel and equal in length. In such a case, the density of current flow and consequent heat generation tends to be highest at the terminus of the bus bar which is perpendicularly across from a point on the opposed bus bar substantially in from the end of that bus bar. Consequently, a large amount of current may flow to a bus bar at one point or area along its length, and a relatively lower amount of current may flow to the bus bar at another point or area along its length.

In order to impose an electric potential across such a coating, bus bars or electrodes are provided on the base. These bus bars should be well bonded to the base. It has been the practice to apply strips of a ceramic silver coating comprising silver powder dispersed in a ceramic or vitrifying binder to the edges of the glass and to fire the coating before applying the tin oxide coating. Thereafter the tin oxide is applied. When silver is used as the bus bar material, the deposition of the conductive tin oxide or similar coating appears to be hindered, and a tendency exists for the coating to be substantially thinner immediately adjacent to the silver bus bar. This reluctance of the conductive film to deposit adjacent to the silver frequently results in the establishment of localized areas having an unusually high resistance immediately adjacent to the bus bar.

One method which has been employed to avoid the establishment of such localized areas having an unusually high resistance immediately adjacent to the bus bar is the provision of a narrow strip of gold or platinum along the inner edge of the bus bar which extends under the edge of the bus bar or overlapping the edge of the bus bar.

It has been found that a substantial reduction in such failures may be accomplished by production of a transparent electroconductive film which has non-uniform resistivity, the resistivity of the film being lowest at the areas where local overheating and failures occur, for example, adjacent to the bus bars and at the ends of the bus bars in the panels such as described above.

In accordance with this invention, a method has been provided to produce transparent electroconductive articles of the type above described, substantially free from failures due to local overheating of the transparent electroconductive film. This method comprises applying a transparent electroconductive film to a refractory base, removing a portion of the film from the base, and then applying another transparent electroconductive film to the base.

Usually, it is preferred to affix the bus bars after the initial film has been partially removed and before the final film is applied. This preference is desirable to insure that the optical properties of the finished article are not impaired. The obvious solution of applying a transparent, electroconductive coating first and then applying the bus bars to the coating is not practical due to the permanent warp resulting from heating the article completely coated with a coating of a different thermal expansivity during firing of the ceramic bus bars. This warping spoils the optical properties of the finished article. The smaller the area coated with such a coating, the less noticeable are the optical defects resulting from warping due to the heating required to fire the bus bars. Therefore, it is desirable to decoat a large portion of the coating prior to applying the bus bars in order to insure that the heating required to fire the bus bars does not mar the finished article's optical properties.

The invention is especially concerned with a refractory base having silver bus bars and an electroconductive transparent tin oxide film and a method of making such an article. In such case the portion of the film which remains after removal of a portion of the initially applied tin oxide film is in the location of the silver bus bars and in the area immediately adjacent to the inner edge of the bus bar, thereby providing good electrical contact between the silver bus bar and the tin oxide film extending between the bus bars.

Accomplishment of the foregoing constitutes some of the principal objects of the present invention, and the manner by which these and other objects of the invention are attained will be more fully understood by reference to the ensuing description taken with the accompanying drawings in which.

Figure 1:
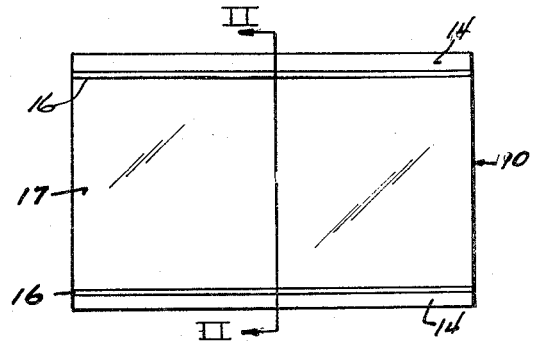
Fig. 1 is a diagrammatic plan view of a glass panel suitable for use as a windshield of an automobile or airplane, embodying the transparent electroconductive film produced according to the present invention.
Figure 2:
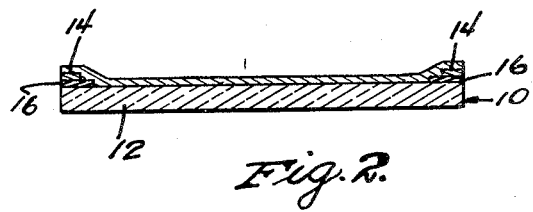
Fig. 2 is a diagrammatic fragmentary sectional view taken along lines II—II of Fig. 1.

In the drawings, Figs. 1 and 2 diagrammatically illustrate a panel 10 which is produced by practice of this invention. The panel 10 comprises a rectangularly shaped glass base 12 having bus bars or conductive marginal edge strips 14 of an electroconductive metal, such as gold, silver, copper, etc., along opposed edges and close to the edges (preferably within 0.5 inch of the edge or on the edge) of the sheet. The bus bars may be connected to opposite poles of a source of potential (not shown). The panel 10 is provided with a transparent electroconductive film comprising two layers 16 and 17 which may be produced by spraying or otherwise applying a tin compound or similar compound to a heated base, as hereinafter more fully described. For purposes of illustrating the invention more clearly, certain of the elements of the heating panel 10 have been exaggerated with respect to their size relative to the other elements.

In the production of the glass panel 10, the glass base 12 is heated to the temperature at which application of the conductive coating 16 may be effected, for example, above about 800° F. but below the fusion point of the glass, usually 950 to 1150° F. When the glass has been heated for 1 or 2 minutes as above described, it is withdrawn from the heating chamber and immediately is sprayed with a coating solution before substantial cooling of the glass sheet 12 can take place.

A suitable coating solution is one made up of the following ingredients:

Stannic chloride_____ 20,430 grams.
Phenyl hydrazine hydrochloride_____ 639 grams.
An aqueous solution of hydrofluoric acid
  containing about 48% by weight of
  hydrofluoric acid _____ 134 grams.
Distilled water_____ 7,056 milliliters.
Dioctyl sodium sulphosuccinate solution  918 milliliters.
Methanol_____ 2,250 milliliters.

A quantity of the coating solution is placed in an atomizing spray gun and the heated glass sheet is sprayed with an atomized spray of this material for a brief period, usually of the order of 2 to 20 seconds, depending upon the thickness of the film to be produced, the air pressure imposed upon the atomizing gun, etc. This process results in the production of a base coated with a transparent electroconductive film, such as a transparent electroconductive tin oxide film which is extremely thin, usually being in the range of 50–800 millimicrons.

The coated base is allowed to cool and dry, and is then prepared for a partial removal of the transparent electroconductive film deposited as described above. All of the film is removed except two narrow strips 16 on opposing marginal edges of the glass base 12 in the location of the proposed bus bars. The size of these strips is such that they extend from approximately the edge of the glass base in towards the center of the glass base for about 1/16 to 1 inch or more beyond the location of the inner edge of the proposed bus bars.

An alternative construction which has been found to be advantageous is to leave a narrow strip of the glass base exposed immediately adjacent the pair of opposing edges of the glass in which the bus bars are to be placed in order that the bus bars may be partly bonded to the exposed marginal edge of the glass and partly bonded to the film 16. Such construction provides better adhesion of the bus bar since the bus bars adhere more firmly to the glass 12 than to the film 16.

In addition to removing a portion of the film in order to obtain control of the heating effects as above described, it is also desirable that a major portion of the initial film is removed in order to prevent excessive stresses set up in the glass during heating of the base for the application of the second film. These stresses are caused by the uneven coefficients of thermal expansion of the glass and the transparent electroconductive film.

The area of the film 16 which is not to be removed is coated with a suitable resistance material, such as an easily removable plastic film or other coating which will resist the attack of a decoating solution, such as is hereinafter described, at such portions where removal of the coating is not desired. For example, in preparing panel 10, an acid resisting coating in the form of pre-cut strips of pressure sensitive regenerated cellulose (cellophane) tape may also be applied to the electroconductive film on the glass on opposing marginal edges of the film. Other methods of preventing the attack of the film-removing solutions will occur to those skilled in the art.

When the portions of the film 16 are thus masked, the unmasked portions of the film are exposed to the action of an acid and a metal more electropositive than the metal of the film itself. Where the film is principally tin oxide, zinc, cadmium, aluminum or iron would be used in the removal process. The removal may be carried out very effectively by depositing upon the coated base a film of finely divided or pulverulent electropositive metal and dispersing agent, such as zinc, and a water dispersible binder which serves as a binding medium to hold the zinc on the base. Thereafter, the zinc coated base may be sprayed or otherwise coated with an aqueous solution of an acid, such as hydrochloric, sulphuric, nitric, oxalic or other mineral or equivalent acid which does not readily etch the glass. Such process is described and claimed in an application of Milton S. Tarnopol, Serial No. 4,929, filed January 28, 1948, now Patent No. 2,606,566, for Treatment of Films. This method of removal of the film is merely illustrative and it is intended that other methods of film removal may be employed in the practice of the invention.

Following this operation, the sheet is allowed to stand for a short period of time, about 5 to 10 minutes, and is then washed with water to remove the remaining acid and other coating components. The electroconductivity of the surface which has been exposed to this treatment will then be found to have been destroyed since the electroconductive coating has been removed.

After a portion of the electroconductive film is thus removed, the glass base 12 is provided with conducting metal strips 14 suitable for bus bars. These metallized strips must be capable of withstanding the temperatures and oxidizing conditions necessary for application of a transparent electroconductive film, and therefore preferably should be of a ceramic character. Furthermore, they should be capable of fusing or otherwise forming an adherent, well-bonded coating to the glass.

In practice, it has been found that the most satisfactory compositions for use in preparing the bus bars comprise a highly conductive metal powder (preferably gold or silver) and a vitrifying binder. The ingredients forming the vitrifying binder; for example, litharge, boric acid, and silica, are heated to a sufficient temperature, for example, 1700° F., to compel them to fuse and form a glass-like mass. This mass is then converted into a frit by grinding, usually in a ball mill. The electroconductive metal, such as pulverulent silver, is then added to this frit, and spraying or screening vehicles are added to the compositions to facilitate their application. Some of the vehicles usually employed are French fat oil, turpentine, water, and ethyl alcohol.

In order to avoid production of bus bars which will develop in use excessive stresses in the glass, the bus bar preferably should be located on the extreme edge of the glass, and the bus bar thickness should not exceed about 0.005 inch, preferably below about 0.003 inch.

After application of the ceramic metal bus bars to the glass sheet by painting or other method, the sheet is heated in an oven to the temperature of about 300° F. to dry the bus bar material. The sheet is then heated to a temperature at which application of a further conductive coating may be effected, for example, above about 800° F. but below the fusion point of the glass, usually 950 to 1150° F. During this heating operation, the ceramic metal coating is fused onto the film 16 so that a firm bond is established between the glass, the film, and the metal coating.

When the glass has been heated as above described for 1 or 2 minutes, it is withdrawn from the heating chamber and immediately is sprayed with a second coating solution (which may be the same or different from that first used) before substantial cooling of the glass can take place thereby forming another layer of transparent electroconductive film 17 on the base. By the use of such method, it can be seen that a double coating of the transparent electroconductive film has been placed upon the base in the area adjacent to the inner edges of the bus bars. The provision of such a double coating establishes good electrical contact between the film and the bus bars, and the use of a gold or platinum strip along the inner edge of the bus bar to provide good electrical contact between the bus bar and the film is thereby obviated.

Figure 3:
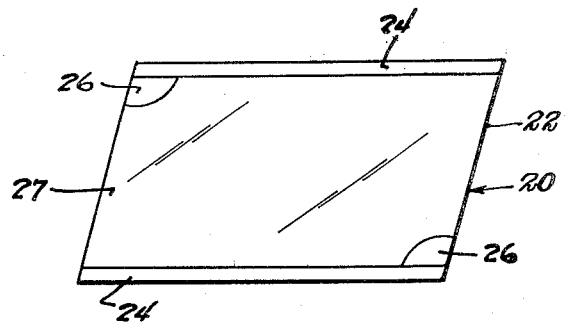
Fig. 3 is a diagrammatic plan view of a glass panel embodying a transparent electroconductive film produced according to a further embodiment of the invention.

In Fig. 3, a further embodiment of the invention is shown in panel 20. The panel 20 comprises a glass base 22 in the shape of a trapezium, closely resembling a parallelogram, having a pair of bus bars or conductive marginal edge strips 24 of an electroconductive metal, such as gold, silver, copper, etc., along the longest opposed edges and close to the edges (preferably within 0.5 inch of the edge or on the edge) of the sheet. The panel 20 is provided with a transparent electroconductive film comprised of coatings 26 and 27 which may be produced by spraying or otherwise applying a tin compound or similar compound on the heated panel, as previously described with respect to the panel illustrated in Figs. 1 and 2.

In this panel, the areas which are most likely to develop overheating are located at the ends of the bus bars which terminate in the obtuse angles of the panel. Thus, the coatings 26 which are applied prior to the bus bars 24 in the manner described above with references to Figs. 1 and 2 are located in the corners of the obtuse angles and are in the approximate shape of a sector of a circle.

The invention is particularly applicable for use in connection with a transparent tin oxide film. However, the invention is also applicable in connection with the production of other transparent electroconductive films, particularly metal oxide films. Thus, the films herein contemplated may comprise cadmium oxide, antimony oxide, zinc oxide, indium oxide, thallium oxide, etc., which may be prepared by using the bromide, chloride or acetate of the corresponding metal.

Where viewing closures for vehicles are to be provided, the base for the film normally is ordinary plate or lime-soda glass. Other refractory materials, including borosilicate glass, china, mica, phosphate glass, porcelain, stone or other refractory composition which melts at temperatures above 1150° to 1350° F., may be provided with electroconductive coatings in the same manner.

Although the present invention has been described with reference to the specific details of certain embodiments thereof, it is not intended that such details shall be regarded as limitations upon the scope of the invention except insofar as included in the accompanying claims. For instance, the invention has been described with respect to removing portions of the initial transparent electroconductive film other than where local overheating is likely to occur. It may be for some purposes that a condition of local overheating is desired in certain areas and in these cases, the initial film may be removed in such areas.

I claim:

1. In a method of producing a transparent electroconductive article which comprises heating a refractory base to a temperature above about 500° F. but below the temperature at which the base melts, the improvement comprising applying a pair of spaced strips of electroconductive material to spaced portions of a surface of the heated base, then applying a bus bar to a portion of each strip, then reheating the base containing the strips and bus bars, and finally applying a transparent electroconductive film to the exposed surface of the reheated base and electroconductive strips.

2. The improvement recited in claim 1 wherein the transparent electroconductive film contains tin oxide.

3. The improvement recited in claim 1, wherein the spaced electroconductive strips are formed by applying an electroconductive film to said base and subsequently removing portions of said film.

4. The improvement recited in claim 1, wherein the bus bars are composed of ceramic silver.

5. A method of producing a transparent electroconductive article comprising applying a pair of spaced strips of electroconductive material to a ceramic base, applying a bus bar to each of said strips in such a manner that the distance between opposing edges of the bus bars is greater than the distance between opposing edges of the strips, and applying a transparent electroconductive coating to said base intermediate said strips and to the exposed portions of said strips.

6. An article of manufacture comprising a refractory base having a surface, a narrow strip of electroconductive material on a portion of said surface, a bus bar located over a portion of the strip to provide an exposed margin on one side of the strip and an electroconductive transparent film contacting said margin and the surface.

7. An article of manufacture comprising a refractory base having a surface, a pair of oppositely spaced narrow strips of electroconductive material on spaced portions of the surface, a pair of oppositely spaced silver bus bars each located over a portion of a strip to expose a margin of each strip, the exposed margins facing each other, and an electroconductive transparent film contacting the exposed margins and the surface intermediate said portions.

8. An article of manufacture which comprises a refractory base having a surface, a narrow strip of electroconductive material on a portion of the surface, a ceramic silver bus bar narrower than said strip thereon and disposed to provide an exposed margin of the strip on one side thereof, and an electroconductive, transparent metal oxide coating contacting said exposed margin and the surface.

9. The article recited in claim 8 wherein the metallic oxide coating contains tin oxide.

10. An article of manufacture comprising a refractory base, a pair of oppositely spaced narrow strips of electroconductive material on said base adjacent the edges thereof and spaced therefrom, a pair of oppositely spaced silver bus bars partially disposed on the strips and partially disposed on said base so as to provide oppositely facing exposed margins of the strips, and an electroconductive, transparent coating on the portion of the base intermediate said strips and said margins.

11. The article described in claim 10 wherein the metal oxide coating contains tin oxide.

References Cited in the file of this patent

UNITED STATES PATENTS

| | | |
|---|---|---|
| 2,513,993 | Burton | July 4, 1950 |
| 2,557,983 | Linder | June 26, 1951 |
| 2,569,773 | Orr | Oct. 2, 1951 |
| 2,624,823 | Lytle | Jan. 6, 1953 |
| 2,628,299 | Gaiser | Feb. 10, 1953 |